United States Patent
Shikanai et al.

(10) Patent No.: US 11,523,620 B2
(45) Date of Patent: Dec. 13, 2022

(54) METHOD FOR DISINFECTING MARINE ANIMALS

(71) Applicant: X-BRAIN CO., LTD., Tokyo (JP)

(72) Inventors: Ryuichiro Shikanai, Tokyo (JP); Masamichi Kikuchi, Tokyo (JP)

(73) Assignee: X-BRAIN CO., LTD., Tokyo (JP)

( * ) Notice: Subject to any disclaimer, the term of this patent is extended or adjusted under 35 U.S.C. 154(b) by 601 days.

(21) Appl. No.: 16/344,427

(22) PCT Filed: Nov. 6, 2017

(86) PCT No.: PCT/JP2017/039949
§ 371 (c)(1),
(2) Date: May 8, 2020

(87) PCT Pub. No.: WO2018/084288
PCT Pub. Date: May 11, 2018

(65) Prior Publication Data
US 2020/0268002 A1    Aug. 27, 2020

(30) Foreign Application Priority Data

Nov. 4, 2016    (JP) .............................. JP2016-216644

(51) Int. Cl.
*A23B 4/015* (2006.01)
*A23B 4/24* (2006.01)
(Continued)

(52) U.S. Cl.
CPC ............ *A23B 4/015* (2013.01); *A01K 63/042* (2013.01); *A23B 4/24* (2013.01); *A23L 3/325* (2013.01); *A23L 17/40* (2016.08)

(58) Field of Classification Search
CPC ......... A23B 4/015; A23L 17/00; A23L 17/40; A23L 3/32; A23L 3/325; A23V 2300/12;
(Continued)

(56) References Cited

U.S. PATENT DOCUMENTS

| | | | |
|---|---|---|---|
| 724,553 A * | 4/1903 | Davis ................... | A23L 3/3409 |
| | | | 426/236 |
| 5,445,798 A | 8/1995 | Ikeda et al. | |
| 2002/0194852 A1 | 12/2002 | Furuta et al. | |

FOREIGN PATENT DOCUMENTS

| | | | | |
|---|---|---|---|---|
| GB | 191423194 A | * | 11/1915 | ............... A23B 4/06 |
| JP | H04166281 A | * | 6/1992 | |

(Continued)

OTHER PUBLICATIONS

M. Yoshimizu, "Development of a seawater electrolyzer for disease prevention in aquaculture and food sanitation," Nippon Suisan Gakkai shi, 72(5), pp. 831-834 (2006).

(Continued)

*Primary Examiner* — Drew E Becker
*Assistant Examiner* — Austin Parker Taylor
(74) *Attorney, Agent, or Firm* — McCarter & English, LLP; David G. Conlin; Nathan D. Harrison

(57) ABSTRACT

An embodiment of the present invention makes it possible to sterilize a marine animal with use of sea water and atmospheric air, to the extent that the marine animal can be eaten as an unheated food product. A sterilization method in accordance with an embodiment of the present invention is a method for sterilizing a marine animal as an unheated food product, the method comprising the steps of: producing oxygen-enriched water by mixing electrolyzed atmospheric air into sea water; producing sterilizing water by electrolyzing the oxygen-enriched water; and bringing the marine animal into contact with the sterilizing water, the sterilizing water containing HOCl, OH$^-$ and O$^-$.

8 Claims, 1 Drawing Sheet

(51) Int. Cl.
*A23L 3/32* (2006.01)
*A01K 63/04* (2006.01)
*A23L 17/40* (2016.01)

(58) Field of Classification Search
CPC . C25B 1/04; C25B 1/22; Y02W 10/10; A01K 63/00–065
USPC .................................................. 426/248, 332
See application file for complete search history.

(56) References Cited

FOREIGN PATENT DOCUMENTS

| | | | | | |
|---|---|---|---|---|---|
| JP | H05131198 | A | * | 5/1993 | |
| JP | 2003-050068 | A | | 2/2003 | |
| JP | 2006-020570 | A | | 1/2006 | |
| JP | 2006020570 | A | * | 1/2006 | |
| JP | 2007-115946 | A | | 5/2007 | |
| JP | 2009-284874 | A | | 12/2009 | |
| JP | 2011-113547 | A | | 6/2011 | |
| KR | 20050097877 | A | * | 10/2005 | |
| WO | WO-2010090361 | A1 | * | 8/2010 | ............. A23B 7/157 |
| WO | WO-2015017415 | A2 | * | 2/2015 | ............... C25B 9/65 |

OTHER PUBLICATIONS

International Search Report dated Feb. 6, 2018 in corresponding International Patent Application No. PCT/JP2017/039949.
International Preliminary Report on Patentability dated May 7, 2019 in corresponding International Patent Application No. PCT/JP2017/039949.

\* cited by examiner

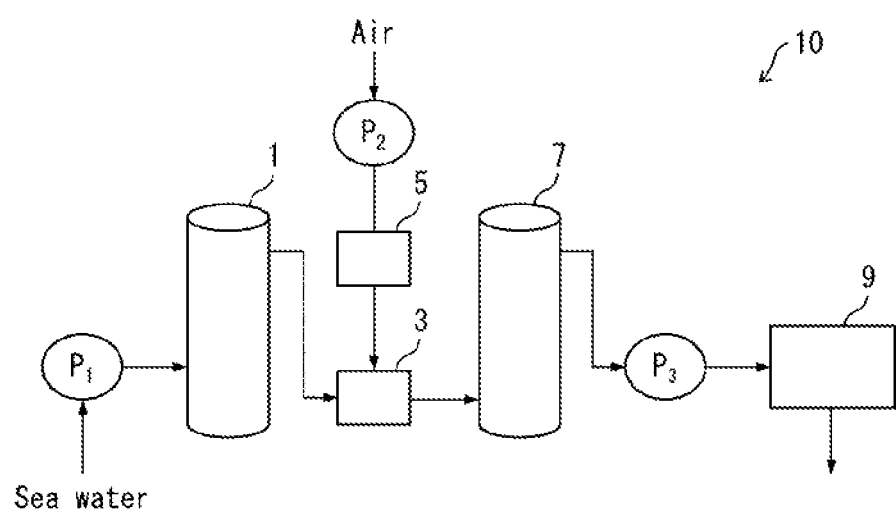

METHOD FOR DISINFECTING MARINE ANIMALS

TECHNICAL FIELD

The present invention relates to a method for sterilizing a marine animal as an unheated food product, more specifically to a method for sterilizing a marine animal with use of sea water and atmospheric air.

BACKGROUND ART

In seasons (particularly, summer) except for winter, a sea water temperature near a sea surface increases as an atmospheric temperature increases. Such increase of the sea water temperature makes pathogens (e.g., bacteria, fungi, and viruses) more active. As the sea water temperature increases, the number of pathogens in a marine animal increases. This leads to an increased risk of infection of a human who eats the marine animal.

In Japan, generally, people are fond of eating unheated raw marine products, and even in summer during which the risk of infection is high, raw marine products are eaten. Supply of many raw marine products relies on aquaculture. Since aquaculture is carried out near the sea surface, it is not possible to avoid a high risk of infection in summer.

The risk of infection at the time when a raw marine product is eaten depends heavily on water quality of a marine area where that marine product was cultured. However, an ideal marine area containing less pathogens and abundant in nutrients is very limited. Accordingly, in a season in which the sea water temperature is high, shipped raw marine products (which meet health standards) are expensive. On the other hand, in view of only nutrients for planktons (phosphorous compound or nitrogen compound), a marine area having relatively low water quality due to inflow of some amount of wastewater from households is suited for aquaculture. Marine animals cultured in such a marine area do not meet, as unheated food products, the health standards unless the marine animals undergo sufficient sterilization treatment particularly in a season in which the sea water temperature is high.

Known examples of the sterilization treatment encompass sterilization of marine animals with use of a chemical agent and thermal sterilization. In addition, it is known that a sterilizing effect is found in acid water which is obtained by electrolyzing tap water to which salt is added (e.g., Non-Patent Literature 1 etc.).

CITATION LIST

Non-Patent Literature

[Non-Patent Literature 1] Nippon Suisan Gakkaishi; 72(5), 831-834 (2006)

SUMMARY OF INVENTION

Technical Problem

However, sterilization with use of a chemical agent almost always produces waste fluid which does not meet environmental standards. On this account, sterilization with use of a chemical agent cannot be easily employed. On the other hand, marine products having undergone thermal treatment are no longer raw. It follows that thermal treatment reduces commercial values of such marine products.

The present invention has been attained in view of the above problems. An object of an embodiment of the present invention is to provide a method for sterilizing a marine animal by using a naturally-occurring material(s).

Solution to Problem

In order to solve the above problem, an embodiment of the present invention provides the following method.

A method for sterilizing a marine animal as an unheated food product, the method including the steps of: producing oxygen-enriched water by mixing electrolyzed atmospheric air into sea water; producing sterilizing water by electrolyzing the oxygen-enriched sea water; and bringing the marine animal into contact with the sterilizing water, the sterilizing water containing NOCl, hypochlorous acid water, hypochlorite ions, OH radicals, and singlet oxygen.

Advantageous Effects of Invention

An embodiment of the present invention advantageously makes it possible to sterilize a marine animal with use of sea water and atmospheric air, to the extent that the marine animal can be eaten as an unheated food product.

BRIEF DESCRIPTION OF DRAWINGS

FIG. 1 is a diagram schematically illustrating a configuration of a sterilization apparatus in accordance with an embodiment of the present invention.

DESCRIPTION OF EMBODIMENTS

[Sterilization Method]

An embodiment of the present invention provides a method for sterilizing a marine animal. This sterilization method includes the steps of: producing oxygen-enriched sea water by mixing electrolyzed atmospheric air into sea water; producing sterilizing water by electrolyzing the oxygen-enriched sea water; and bringing the marine animal into contact with the sterilizing water. The sterilizing water contains NOCl, hypochlorous acid water (HOCl), hypochlorite ions (OCl$^-$), OH radicals, and singlet oxygen. These components contained in the sterilizing water mainly exhibit a sterilizing effect. Each of the components exhibits a very high oxidative activity (accordingly, a high sterilizing effect). Thus, the components rapidly react with bacteria and/or the like adhered to the marine animal, and are consumed within a very short period of time. Further, the singlet oxygen may produce NaCl, NOCl, hypochlorous acid water, hypochlorite ions and OH radicals, reacting with components of sea water and atmospheric air. Therefore, in the sterilizing water, the singlet oxygen produced is partially converted to NOCl, hypochlorous acid water, hypochlorite ions, and OH radicals. In light of the above, it can be described that the sterilizing water contains NOCl, hypochlorous acid water, hypochlorite ions, OH radicals, and singlet oxygen, during a period from production of the sterilizing water to contact of the sterilizing water with the marine animal.

The above sterilization method includes carrying out electrolysis two times. First electrolysis: In electrolysis of atmospheric air, some of oxygen molecules in the atmospheric air produce singlet oxygen, and further, various oxides (e.g., $NO_x$, $SO_x$, $CO_x$, etc.) when some singlet oxygen thus produced reacts with the atmospheric air. Therefore, mixing sea water with the atmospheric air having been electrolyzed efficiently increases an amount of oxygen (atoms) present in the sea water (oxygen-enriched sea water is produced). Second electrolysis: Electrolysis of the oxygen-enriched sea water may release, as singlet oxygen, oxygen contained in components of the sea water and the atmospheric air. As a result of liberation of the singlet oxygen, an abundance ratio of singlet oxygen increases. This produces the sterilizing water.

As described above, the above sterilization method allows a marine animal to be sterilized with use of the sterilizing water made from sea water and atmospheric air. The sterilizing water is produced by using natural materials. Further, the sterilizing water is similar to a mixture of sea water and atmospheric air which mixture is naturally produced, for example, in an unstable atmosphere state (e.g., thunderstorm). The sterilizing water is similar to such a mixture in composition of elements contained, although the content of oxygen differs from that of the mixture. Therefore, in a case where the sterilizing water is brought back into the sea after used in the above sterilization method, the sterilizing water is restored to original atmospheric air and sea water by an effect of natural circulation.

As used herein, the term "unheated food product" refers to food which can be eaten raw as it is without being cooked (e.g., food which meets the health standards for unheated food products, which standards are defined by the Japanese Health, Labour and Welfare Ministry). Therefore, the "unheated food product" can be eaten cooked or eaten unheated. The food may contain an inedible portion. Examples of the inedible portion include a skeleton, surface skin, an outer shell, and some of organs. Therefore, an object to be sterilized by the above sterilization method may be a whole or part of an organism. The object is preferably a living organism. The above inedible portion in an unheated food product may be removed or cut off from the organism after the organism is sterilized.

As used herein, the term "sterilization" refers to decreasing or eliminating toxicity of an unheated food product, which toxicity may occur after the unheated food product is taken into a human body. The toxicity is caused by pathogens (e.g., bacteria, fungi, or viruses) contained in an organism as the unheated food product. Therefore, sterilization refers to disinfecting or antisepticizing the organism. The sterilization leads to attenuation, killing, extinction or destruction of the pathogens. In an embodiment, the sterilization decreases or eliminates infectivity of the pathogens. Elimination of infectivity is achieved by depriving the pathogens of infectious ability (e.g., neutralization of viruses) or causing activity of the pathogens to stop (e.g., bacteriolysis or degradation of viruses).

Examples of pathogens present in an organism, the number of which pathogens can be decreased by performing the above sterilization method, encompass bacteria, viruses, and fungi, as described above. The pathogens can grow near a sea surface and near a river mouth. Examples of the bacteria encompasses: pathogenic *Escherichia coli*; bacteria belonging to the genus *Vibrio* (*Vibrio parahaemolyticus, Vibrio cholerae*, non-agglutinable *vibrio* (NAG *vibrio*), *Vibrio fluvialis, Vibrio mimicus, Vibrio vulnificus*, etc.); bacteria belonging to the genus *Salmonella* (*Salmonella enteritidis*); bacteria belonging to the genus *Clostridium* (*Clostridium perfringens, Clostridium botulinum*, etc.); bacteria belonging to the genus *Listeria* (*Listeria monocytogenes*); bacteria belonging to the genus *Shigella* (*Shigella dysenteriae*); bacteria belonging to the genus *Staphylococcus* (*Staphylococcus aureus*); and bacteria belonging to the genus *Bacillus* (*Bacillus cereus*). Examples of the viruses encompass the genus *Norovirus*.

As used herein, the term "marine animal" refers to an animal for human consumption among animals inhabiting in the sea, which animal has an organ to take oxygen into a body of the animal from sea water. The marine animal is particularly a shellfish. The shellfish is a bivalve or a snail. Concrete examples of the shellfish encompass: oyster, scallop, abalone, horned turban, and surf clam.

As used herein, the wording "putting the sterilizing water in contact with the marine animal" refers to putting the sterilizing water in contact with an external surface and the inside of an organ of the marine animal. The organ which the sterilizing water is put in contact with encompasses a respiratory organ, a digestive/absorptive organ, and an excretory organ. The term "the inside of an organ" here refers to a surface which directly comes in contact with sea water (body fluid containing sea water) in respiration, contact, and excretion of the marine animal. Therefore, "the inside of an organ" can be regarded as a portion of an "external surface". However, in the present specification, on the basis of general distinction but not on the basis of biological distinction, the "external surface" refers to a portion which can be observed externally from the outside of the living body while "the inside of an organ" refers to a portion outside the living body which portion can be observed, for example, when the living body is dissected.

The term "sterilizing water" as used herein refers to water containing NOCl, hypochlorous acid water, hypochlorite ions, OH radicals and singlet oxygen (mixture of sea water and atmospheric air). Therefore, the "sterilizing water" is aqueous liquid for sterilizing a marine animal. It is only necessary that the marine animal put in contact with the "sterilizing water" is sterilized and it is unnecessary that the "sterilizing water" itself is sterilized or disinfected.

In order to fully utilize high reactivity of the above components of the sterilizing water, it is preferable that the sterilizing water be used in contact with a marine animal immediately after the sterilizing water is produced. Therefore, in an actual sterilization method, most preferably, the marine animal is sterilized substantially at the same time as the sterilizing water is produced as discussed in Examples described later.

In an embodiment, the first electrolysis and the second electrolysis are each carried out for several seconds (e.g., 1, 2, 3, 4, 5, 6, 7, 8, or 9 seconds) at an electric power of 2.5 kW to 6.5 kW with respect to 1 $cm^3$ of atmospheric air. In a case where the first electrolysis and the second electrolysis are each carried out in the above ranges of conditions, it is possible to sufficiently electrolyze the oxygen molecules in the atmospheric air.

A mixing ratio of the atmospheric air and the sea water may vary depending on an amount of a basic substance present in the sea water. The amount of the basic substance present in the sea water also varies depending on various conditions. In one example embodiment, the mixing ratio of the atmospheric air to the sea water is in a range of 1:5 (v/v) to 1:15 (v/v). The mixing ratio of the sea water and the atmospheric air in the above range allows for supply of elements necessary for producing NOCl, HOCl, and OH radicals. Further, the above mixing ratio does not make a dissolved oxygen level in the sterilizing water excessive for respiration of the marine animal.

The above sterilization method includes the step of carrying out irradiation with ultraviolet light at least one time. In an embodiment, the sterilization method includes the step of carrying out irradiation with ultraviolet light once and this step can be carried out with respect to the sea water prior to mixing the sea water with the atmospheric air or the sterilizing water prior to putting the sterilizing water in contact with the marine animal. In another embodiment, the sterilization method includes the step of carrying out irradiation with ultraviolet light two times. This step can be carried out with respect to the sea water prior to mixing the sea water with the atmospheric air or the sterilizing water prior to putting the sterilizing water in contact with the marine animal. In the above embodiments, the step of carrying out irradiation with ultraviolet light is a step of sterilizing the sea water or the sterilizing water by killing pathogens contained in the sea water or the sterilizing water. The ultraviolet light has a wavelength in a range of 181 nm to 330 nm. In irradiation with such ultraviolet light, the ultraviolet light exhibits a sterilizing property.

The above sterilization method allows for shipping of marine animals as unheated food products for distribution in any season. Further, in the above sterilization method, it is not necessary that marine animals are grown, until shipment of the marine animals, in a water area where eggs of the marine animals have hatched. For example, adult marine animals whose size is not sufficiently large for shipping for distribution are transferred from a first growing area to another area (second growing area) which is closer to a region where those marine animals will be consumed as unheated food products. After the marine animals have grown to a sufficiently large size in the second growing area, the marine animals can be sterilized by the sterilization method in accordance with an embodiment of the present invention and shipped for distribution. Such two-step growing eliminates the need for transporting adult marine animals whose size is sufficiently large for sipping for distribution. This can reduce transportation cost of the marine animals.

Further, in a case where there arises a risk that marine animals in the first growing area may die because of a natural disaster or temporary deterioration of water quality, the marine animals in the first growing area can be transferred into the second growing area, so that an economic loss can be prevented before that risk turns into reality. The marine animals as unheated food products are generally produced by aquaculture and hygienic safety depends on water quality of a marine area where the marine animals are cultured. However, the above sterilization method in accordance with an embodiment of the present invention makes it possible to supply, to a market, hygienically safe marine animals as unheated food products regardless of water quality of a growing area.

The presence of NOCl, HOCl, OH radicals, and singlet oxygen in the sterilizing water can be detected by using a commercially available kit or agent (e.g., DO kit, COD kit, $O^3$ kit, or tolidine reagent (each of which is available in the market from more than one maker with different product names)).

[Sterilization Apparatus]

An embodiment of the present invention provides a sterilization apparatus. The following description will discuss the sterilization apparatus, with reference to FIG. 1. FIG. 1 is a diagram schematically illustrating a configuration of a sterilization apparatus 10 in accordance with an embodiment of the present invention.

As illustrated in FIG. 1, the sterilization apparatus 10 includes a first irradiation tank 1, a mixing tank 3, an electrolysis tank 5, a second irradiation tank 7, and a sterilization tank 9. Into the first irradiation tank 1, sea water is introduced from the sea via a first pump $P_1$. Into the electrolysis tank 5, atmospheric air is introduced from the atmosphere via a second pump $P_2$. The sea water and the atmospheric air having been introduced are mixed in the mixing tank 3, and then, supplied to the sterilization tank 9 via the second irradiation tank 7 and the third pump $P_3$. The following will discuss details of functions of respective components in the sterilization apparatus 10.

The first pump $P_1$ is a pump for introducing sea water into the first irradiation tank 1, as described above. The first pump $P_1$ is an ordinary pump capable of adjusting an amount of sea water to be introduced into the first irradiation tank 1.

The first irradiation tank 1 is a container for irradiating, with ultraviolet light, the sea water having been introduced via the first pump $P_1$. Therefore, the first irradiation tank 1 is made of any material which will not be corroded by sea water. Inside the first irradiation tank 1, an ultraviolet light irradiation lamp (not illustrated) is provided. In FIG. 1, though the first irradiation tank 1 is illustrated as a cylindrical container provided at an intermediate part of a pipe which is shown by a solid line, the first irradiation tank 1 can be a pipe provided with an ultraviolet light irradiation lamp. The sea water having been irradiated with ultraviolet light in the first irradiation tank 1 is sent to the mixing tank 3.

The second pump $P_2$ is a pump for introducing atmospheric air into the electrolysis tank 5, as described above. The second pump $P_2$ is an ordinary pump capable of adjusting an amount of atmospheric air to be introduced into the electrolysis tank 5.

The electrolysis tank 5 is a container for partially electrolyzing the atmospheric air which is introduced via the second pump $P_2$. Inside the electrolysis tank 5, a positive terminal and a negative terminal (not illustrated), which are connected to a power source, are provided. In FIG. 1, though the electrolysis tank 5 is illustrated as a rectangular container provided at an intermediate part of another pipe shown by another solid line, the electrolysis tank 5 can be a pipe provided with the positive electrode and the electrode. The atmospheric air which has been partially electrolyzed in the electrolysis tank 5 (hereinafter, referred to as simply "air") is sent to the mixing tank 3.

The mixing tank 3 is a container for partially electrolyzing a mixture (oxygen-enriched sea water) of the sea water and the air after the sea water from the first irradiation tank 1 and the air from the electrolysis tank 5 are mixed with each other. In the mixing tank 3, the air is sent into the sea water, so that the oxygen-enriched sea water is produced. For example, the oxygen-enriched sea water is produced by blowing the air into (e.g., bubbling) the sea water present in the mixing tank 3. At this time, the air is injected into the sea water from below the surface of the sea water in the mixing tank 3. Therefore, operation of the second pump $P_2$ causes the air to be injected, into the mixing tank 3, with a pressure higher than a water pressure in accordance with a depth of water at which depth a jet orifice of the air is provided.

Further, the oxygen-enriched sea water is partially electrolyzed in the mixing tank 3. Therefore, the mixing tank 3 is provided with a positive terminal and a negative terminal which are connected to a power source. In FIG. 1, though the mixing tank 3 is illustrated as a rectangular container, the mixing tank 3 can include two parts, one of which is a rectangular container that is a part for producing the oxygen-enriched sea water and the other one of which is a pipe provided with electrodes for partially electrolyzing the oxygen-enriched sea water from the rectangular container. Thereafter, the oxygen-enriched sea water (sterilizing water) having been partially electrolyzed is sent to the second irradiation tank 7. A material of the negative electrode can be a metal which has a high resistance to electric corrosion in salt water (e.g., Ti, Md, Ag, Au, or Pt).

The second irradiation tank 7 is similar in configuration to the first irradiation tank 1 and therefore, an explanation thereof will be omitted. The sterilizing water from the second irradiation tank 7 is sent to the sterilization tank 9 via the third pump $P_3$.

The sterilization tank 9 is a container for sterilizing a marine animal by putting the sterilizing water in contact with the marine animal. Before the sterilization apparatus 10 is operated, the marine animal which is an object of sterilization is put in the sterilization tank 9. While the sterilizing water is sent into the sterilization tank 9, the sterilizing water is discharged from the sterilization tank 9 sterilizing water. A volume of the sterilizing water sent into the sterilization tank 9 is equal to that of the sterilizing water discharged from the sterilizing water 9. The marine animal put in the sterilization tank 9 is sterilized by causing the sterilization apparatus 10 to operate for a predetermined period of time (e.g., one or two hours).

In an embodiment of the present invention, before the marine animal is put in the sterilization tank 9, the sterilization tank 9 can be cleaned with use of the sterilizing water by preliminarily causing the sterilization apparatus 10 to operate or another method (e.g., ultraviolet light irradiation, or sterilization with use of a sterilizing agent).

(Recap)

The following is an overview of each embodiment of the present invention.

(1) A method for sterilizing a marine animal as an unheated food product, the method including the steps of: producing oxygen-enriched sea water by mixing electrolyzed atmospheric air into sea water; producing sterilizing water by electrolyzing the oxygen-enriched sea water; and putting the sterilizing water in contact with the marine animal, the sterilizing water containing NOCl, hypochlorous acid water, hypochlorite ions, OH radicals, and singlet oxygen.

(2) The method as described in (1), wherein: the sea water and the atmospheric air are mixed with each other at a mixing ratio of the sea water and the atmospheric air in a range of 1:5 (v/v) to 1:15 (v/v).

(3) The method as described in (1) or (2), wherein: the marine animal is a shellfish.

(4) The method as described in any one of (1) to (3), further including the step of: irradiating, with ultraviolet light, the sea water prior to mixing the sea water with the atmospheric air or the sterilizing water prior to putting the sterilizing water in contact with the marine animal.

Examples

[Growing Oysters Under Regular Aquaculture Conditions]

Oysters were grown in the following places in the following season under conditions (except for a season) similar to those for growing edible oysters.

Places: two places in Japan arbitrarily selected from environments suited for growing oysters Season: season from spring to summer The two places were a few hundred kilometers apart from each other and were different from each other in terms of environment. In each of the above places, growing the oysters started from two different time points and accordingly, the oysters were grown in two different terms (that is, the oysters were grown four times in total in the two places selected). Note that a permission for using each place (marine area) for a growth test of oysters was obtained from an individual or a group who/which manages that place. For growing oysters, a rope to which two or more mesh baskets were attached in a row was prepared. Then, oysters were put in these mesh baskets. The oysters were sunk into the sea while the rope was hung on a float floating on the sea. After approximately fourteen days, when the oysters were deemed to have been sufficiently settled in their growing environment, the rope was pulled out of the sea. The oysters which had been grown each time in each place were separated into two groups. One group (untreated group) of oysters was put in an airtight container directly after the oysters had been pulled out from the sea. The other group (treatment group) of oysters was subjected to sterilization treatment described below, after the oysters had been pulled out from the sea.

[Sterilization Treatment of Oysters]

The oysters selected for the treatment group were further separated into two treatment groups, and each treatment group of oysters was put in the sterilization tank 9 of the sterilization apparatus 10 illustrated as an example in FIG. 1. After one of the treatment groups of the oysters was put in the sterilization tank 9, the sterilization apparatus 10 was operated for one hour. In this case, a mixing ratio of the atmospheric air to the sea water was 1:5 (v/v). After the other one of the treatment groups of the oysters was put in the sterilization tank 9, the sterilization apparatus 10 was operated for two hours. Note that an intake of the first pump $P_1$ and an outfall of the third pump $P_3$ were provided at positions very close to a place where the oysters were grown. In other words, the oysters in the untreated group and the oysters in the treatment group were prevented from coming in contact with sea water from other places, after growing the oysters had been started. In the sterilization tank 9, the oysters were put aseptically in an airtight container after one-hour operation of the sterilization apparatus 10 (treated group 1). On the other hand, in the sterilization tank 9, the oysters were put aseptically in another airtight container after one-hour operation of the sterilization apparatus 10 (treated group 2).

It was confirmed by use of the above-described $O^3$ kit that the sterilizing water supplied to the sterilization tank 9 contained at least singlet oxygen. This clarified that the sterilizing water contained at least NOCl, HOCl, OH radicals, and singlet oxygen.

[Safety Evaluation of Oysters, as Unheated Food Products, in Treated Groups and Untreated Group]

Safety evaluation of the oysters, as unheated food products, which had been grown each time in each place was outsourced (to Kabushiki Kaisha Shokuhin Biseibutsu Senta (K.K. Food Microbiology Center)). Contents of a report received from that company to which the evaluation had been outsourced were compiled in Table 1.

In the report from the company to which the evaluation had been outsourced, the following was stated with regard to a testing method: "Testing method: Standard Methods of Analysis in Food Safety Regulation—Microbiology (1990, 2004) and Standard Methods of Analysis in Food Safety Regulation Supplement II—Microbiology (1996), supervising editor: the Japanese Ministry of Health, Labour and Welfare were applied with necessary modification". Further, in the report, the following was also stated as test methods (employed culture media) for various test items (microbial species): General living microbes: standard agar medium, *Coli* group: XM-G agar medium, *Coli* group: XM-G agar medium, and *Staphylococcus aureus*: mannitol salt agar with egg yolk. In addition, in the above report, the following was further stated as a standard value for evaluation of unheated food (the number of microbes contained in 1 g of sample): General living microbes: $1.0 \times 10^4$ (less than 10,000), *Coli* group: 10×10³ (less than 1,000), *Escherichia coli*: negative, and fungi, molds, and yeasts: 8.0×10² (less than 800).

Note that in Table 1, the numbers 0, 1, and 2 were assigned, in accordance with the length of time of sterilization treatment, to three kinds of oysters (untreated group, treated group 1, and treated group 2) which had been grown in one term, respectively. Further, the number (1 or 2) indicative of a place where the oysters were grown and an alphabet (a or b) indicative of whether the oysters were grown in a first term or a second term were assigned to each of the above groups before the above number indicative of the length of time of sterilization treatment. For example, in Table 1, "1a-1" represents oysters which were grown in the first term at a first place and which underwent one-hour sterilization treatment.

TABLE 1

| | General living microbes *1 | *Coli* group | *Escherichia coli* | *Staphylococcus aureus* *3 |
|---|---|---|---|---|
| 1a-0 | <300 | — *2 | — *2 | — |
| 1a-1 | <300 | — *2 | — *2 | — |
| 1a-2 | <300 | — *2 | — *2 | — |
| 1b-0 | 2.3 × 10⁵ | 3.6 × 10² *1 | 1.0 × 10 *1 | — |
| 1b-1 | 3.9 × 10² | — *2 | — *2 | — |
| 1b-2 | 3.3 × 10² | — *2 | — *2 | — |
| 2a-0 | <300 | 1.0 × 10 *1 | 1.0 × 10 *1 | — |
| 2a-1 | <300 | — *2 | — *2 | — |
| 2a-2 | <300 | — *2 | — *2 | — |

*1: CFU/g
*2: CFU/0.1 g
*3: CFU/0.01 g
—: below detection limit

Results in items of evaluation, as shown in Table 1, show that even in a case where the result of the oysters in the untreated group (the last number assigned is 0) is higher than the standard value (hygienically unsuitable for unheated food products), the results of the oysters subjected to the above-described sterilization treatment become lower than the standard value. More specifically, for example, in cases of items "General living microbes", "*Coli* group" and "*Escherichia coli*" in a test group 1b, ten to hundreds of thousands (CFU/g) of microbes of the *Coli* group and *Escherichia coli* which had been present prior to sterilization were reduced to approximately $1/1000$ or reduced to below detection limit (CFU/0.1 g) by the sterilization treatment (one hour) in accordance with the present Example (sterilization rate: approximately not less than 99.83% to approximately not less than 99.99%). With regard to the values of General living microbes, the sterilization rate of a one-hour treatment is equivalent to that of a two-hour treatment. Therefore, the sterilization treatment in accordance with the present Example exerts a sufficient sterilizing effect within one hour. In light of this, it is predicted that even a shorter period of treatment time (e.g., 10 minutes to 30 minutes) can sufficiently sterilize the oysters to the extent that the oysters can be eaten raw as unheated food products. Therefore, sterilization by the method in accordance with an embodiment of the present invention makes it possible to supply, to the market, landed raw oysters as unheated food products which meet the health standards of food, in a season from spring to summer in which season activities of pathogens (bacteria, fungi, and viruses) are relatively active.

Next, with regard to performance of the sterilization apparatus 10, the performance for inactivating viruses in the sea water was tested (actual test operations were performed by Hygiene and Microbiology Research Laboratory of Kitasato University). Sea water for use in this test was sea water (at a water temperature of 21° C.) into which a Coxsackie virus (Coxsackie virus B6 schmin) was mixed at a concentration of 3.0×10³ virions/ml. Equal amounts of the following four kinds of sea water (No 1 to No 4) were each put into a culture medium of culture cells (prepared in advance). The four kinds of sea water were: sea water which has not been treated by the sterilization apparatus 10 (No 1); sea water which has been subjected to the sterilization treatment one time in the sterilization apparatus 10 and then taken out from an outlet port of the sterilization apparatus 10; sea water obtained from a tank of the sterilization apparatus 10 after five minutes from the start of a sterilization treatment during a circulatory operation of the sterilization apparatus 10 (No 3); and sea water obtained from the tank of the sterilization apparatus 10 after ten minutes from the start of the sterilization treatment during the circulatory operation of the sterilization apparatus 10 (No 4). The number of infected cells was counted 24 hours after each kind of the above-described sea water had been put in the culture medium. Table 2 shows results of this count.

TABLE 2

| | Number of viruses per ml | Detection rate | Inactivation rate |
|---|---|---|---|
| No1 | 3.0 × 10³ | 100% | 0% |
| No2 | 0 | <1% | 99.9% |
| No3 | 0 | <1% | 99.9% |
| No4 | 0 | <1% | 99.9% |

As shown in Table 2, in the case of No 1, infected cells were found and the number of the infected cells corresponded to the concentration of the viruses mixed in the sea water. In contrast, in all cases of No 2, No 3, and No 4, viruses were substantially completely inactivated. This demonstrated that the sterilization apparatus 10 is capable of inactivating viruses in a very short period of time.

INDUSTRIAL APPLICABILITY

An embodiment of the present invention is applicable to sterilization of marine animals as unheated food products.

REFERENCE SIGNS LIST

1 First irradiation tank
3 Mixing tank
5 Electrolysis tank
7 Second irradiation tank
9 Sterilization tank
10 Sterilization apparatus
$P_1$ to $P_3$ First pump to third pump

The invention claimed is:

1. A method for sterilizing a marine animal as an unheated food product, the method comprising the steps of:
producing oxygen-enriched sea water by mixing electrolyzed atmospheric air into sea water, the oxygen-enriched sea water containing an increased amount of oxygen (atoms), the electrolyzed atmospheric air being obtained by electrolyzing atmospheric air at an electric power of 2.5 kW to 6.5 kW per 1 cm³ of the atmospheric air;
producing sterilizing water by electrolyzing the oxygen-enriched sea water at an electric power of 2.5 kW to 6.5 kW per 1 cm³ of atmospheric air, the sterilizing water containing an increased abundance ratio of singlet oxygen; and putting the sterilizing water in contact with the marine animal for 10 minutes to 2 hours, wherein the sterilizing water contains NOCl, hypochlorous acid water, hypochlorite ions, OH radicals, and singlet oxygen;

the marine animal is living; and the step of putting the sterilizing water in contact with the marine animal decreases the number of bacteria adhered to the marine animal.

2. The method as set forth in claim 1, wherein:
the atmospheric air and the sea water are mixed with each other at a mixing ratio of the atmospheric air and the sea water in a range of 1:5 (v/v) to 1:15 (v/v).

3. The method as set forth in claim 1, wherein:
the marine animal is a shellfish.

4. The method as set forth in claim 1, further comprising the step of:
irradiating, with ultraviolet light, the sea water prior to mixing the sea water with the atmospheric air or the sterilizing water prior to putting the sterilizing water in contact with the marine animal.

5. The method as set forth in claim 2, wherein:
the marine animal is a shellfish.

6. The method as set forth in claim 2, further comprising the step of:
irradiating, with ultraviolet light, the sea water prior to mixing the sea water with the atmospheric air or the sterilizing water prior to putting the sterilizing water in contact with the marine animal.

7. The method as set forth in claim 3, further comprising the step of:
irradiating, with ultraviolet light, the sea water prior to mixing the sea water with the atmospheric air or the sterilizing water prior to putting the sterilizing water in contact with the marine animal.

8. The method as set forth in claim 5, further comprising the step of:
irradiating, with ultraviolet light, the sea water prior to mixing the sea water with the atmospheric air or the sterilizing water prior to putting the sterilizing water in contact with the marine animal.

* * * * *